US008009800B2

(12) United States Patent
Doyle et al.

(10) Patent No.: US 8,009,800 B2
(45) Date of Patent: Aug. 30, 2011

(54) TRAY FOR ASSESSING THE THREAT STATUS OF AN ARTICLE AT A SECURITY CHECK POINT

(75) Inventors: Aidan Doyle, Quebec (CA); Dan Gudmundson, Quebec (CA)

(73) Assignee: Optosecurity Inc., Quebec, Quebec (CA)

( * ) Notice: Subject to any disclaimer, the term of this patent is extended or adjusted under 35 U.S.C. 154(b) by 27 days.

(21) Appl. No.: 12/385,253

(22) Filed: Apr. 2, 2009

(65) Prior Publication Data
US 2009/0196396 A1 Aug. 6, 2009

Related U.S. Application Data

(63) Continuation of application No. PCT/CA2007/001749, filed on Oct. 1, 2007.

(60) Provisional application No. 60/827,784, filed on Oct. 2, 2006.

(51) Int. Cl.
*G01N 23/083* (2006.01)
*G01N 23/10* (2006.01)

(52) U.S. Cl. ............. 378/56; 378/57; 378/207; 378/208

(58) Field of Classification Search ............... 378/56, 378/57, 207, 208
See application file for complete search history.

(56) References Cited

U.S. PATENT DOCUMENTS

| | | | |
|---|---|---|---|
| 3,589,511 A | 6/1971 | Britt | |
| 3,609,045 A | 9/1971 | Stein | |
| 3,673,394 A * | 6/1972 | Hartmann | ........... 702/172 |
| 4,392,237 A | 7/1983 | Houston | |
| 4,454,949 A | 6/1984 | Flum | |
| 4,864,142 A | 9/1989 | Gomberg | |
| 4,870,666 A * | 9/1989 | Lonn | ........... 378/18 |
| 4,962,515 A | 10/1990 | Kopans | |
| 4,974,247 A | 11/1990 | Friddell | |
| 4,985,906 A * | 1/1991 | Arnold | ........... 378/18 |
| 5,044,002 A | 8/1991 | Stein | |
| 5,056,124 A | 10/1991 | Kakimoto et al. | |
| 5,400,381 A | 3/1995 | Steude et al. | |
| 5,428,657 A | 6/1995 | Papanicolopoulos et al. | |
| 5,442,672 A | 8/1995 | Bjorkholm et al. | |

(Continued)

FOREIGN PATENT DOCUMENTS
CA 2574402 1/2006

(Continued)

OTHER PUBLICATIONS

Office Action mailed on Jul. 29, 2009 in connection with Canadian Patent Application 2,651,728.

(Continued)

*Primary Examiner* — Edward J Glick
*Assistant Examiner* — Thomas R Artman

(57) ABSTRACT

A method for performing security screening of a liquid product at a security checkpoint is provided. The liquid product is placed in a tray having at least two reference areas manifesting respective X-ray signatures when exposed to X-rays, the X-ray signatures being distinguishable from one another. An X-ray inspection of the tray is performed while the tray holds the liquid product, the X-ray inspection including deriving the X-ray signatures. A determination is made as to whether the liquid product is a security threat at least in part based on the X-ray signatures. A tray having at least two reference areas manifesting respective X-ray signatures when exposed to X-rays is also provided.

52 Claims, 7 Drawing Sheets

U.S. PATENT DOCUMENTS

| | | | |
|---|---|---|---|
| 5,490,218 A | 2/1996 | Krug et al. | |
| 5,557,108 A | 9/1996 | Tumer | |
| 5,568,262 A | 10/1996 | LaChapelle et al. | |
| 5,600,303 A | 2/1997 | Husseiny et al. | |
| 5,600,700 A * | 2/1997 | Krug et al. | 378/57 |
| 5,692,029 A | 11/1997 | Husseiny et al. | |
| 5,768,334 A * | 6/1998 | Maitrejean et al. | 378/53 |
| 5,838,758 A | 11/1998 | Krug et al. | |
| 5,864,600 A | 1/1999 | Gray et al. | |
| 6,018,562 A | 1/2000 | Willson | |
| 6,026,171 A | 2/2000 | Hiraoglu et al. | |
| 6,054,712 A | 4/2000 | Komardin et al. | |
| 6,069,936 A | 5/2000 | Bjorkholm | |
| 6,542,574 B2 | 4/2003 | Grodzins | |
| 6,654,445 B2 | 11/2003 | Shepherd et al. | |
| 6,707,381 B1 | 3/2004 | Maloney | |
| 6,707,879 B2 | 3/2004 | McClelland et al. | |
| 6,721,387 B1 | 4/2004 | Naidu et al. | |
| 6,721,391 B2 | 4/2004 | McClelland et al. | |
| 6,763,083 B2 | 7/2004 | Fernandez | |
| H2110 H | 10/2004 | Newman | |
| 6,840,120 B2 | 1/2005 | Sakairi et al. | |
| 6,952,163 B2 | 10/2005 | Huey et al. | |
| 7,065,175 B2 | 6/2006 | Green | |
| 7,092,485 B2 | 8/2006 | Kravis | |
| 7,164,750 B2 | 1/2007 | Nabors et al. | |
| 7,257,188 B2 | 8/2007 | Bjorkholm | |
| 7,274,768 B2 | 9/2007 | Green | |
| 7,317,390 B2 * | 1/2008 | Huey et al. | 340/552 |
| 7,355,402 B1 | 4/2008 | Taicher et al. | |
| 7,386,093 B2 | 6/2008 | Wu et al. | |
| 7,614,788 B2 * | 11/2009 | Gatten | 378/57 |
| 7,789,401 B2 | 9/2010 | Ambrefe, Jr. | |
| 2001/0033636 A1 | 10/2001 | Hartick et al. | |
| 2003/0062373 A1 | 4/2003 | Holland | |
| 2004/0016271 A1 | 1/2004 | Shah et al. | |
| 2004/0101097 A1 | 5/2004 | Kyoichiro et al. | |
| 2004/0252024 A1 | 12/2004 | Huey et al. | |
| 2005/0036689 A1 | 2/2005 | Mahdavieh | |
| 2005/0058242 A1 | 3/2005 | Peschmann | |
| 2005/0111618 A1 | 5/2005 | Sommer, Jr. et al. | |
| 2005/0117700 A1 | 6/2005 | Peschmann | |
| 2005/0173284 A1 | 8/2005 | Ambrefe | |
| 2005/0193648 A1 | 9/2005 | Klein et al. | |
| 2006/0078085 A1 | 4/2006 | Zanker | |
| 2006/0086794 A1 | 4/2006 | Knowles et al. | |
| 2006/0115044 A1 | 6/2006 | Wu et al. | |
| 2006/0193434 A1 | 8/2006 | Green | |
| 2006/0203960 A1 | 9/2006 | Schlomka et al. | |
| 2006/0257005 A1 | 11/2006 | Bergeron et al. | |
| 2007/0003009 A1 | 1/2007 | Gray | |
| 2007/0013519 A1 | 1/2007 | Chung et al. | |
| 2007/0041612 A1 | 2/2007 | Perron et al. | |
| 2007/0041613 A1 | 2/2007 | Perron et al. | |
| 2007/0058037 A1 | 3/2007 | Bergeron et al. | |
| 2007/0132580 A1 | 6/2007 | Ambrefe, Jr. | |
| 2007/0133743 A1 | 6/2007 | Johnson et al. | |
| 2007/0192850 A1 | 8/2007 | Cowburn | |
| 2007/0217571 A1 | 9/2007 | Teslyar et al. | |
| 2007/0297560 A1 | 12/2007 | Song et al. | |
| 2008/0062262 A1 | 3/2008 | Perron et al. | |
| 2008/0116267 A1 | 5/2008 | Barber | |
| 2008/0138475 A1 | 6/2008 | Heuft | |
| 2008/0152082 A1 | 6/2008 | Bouchard et al. | |
| 2008/0170660 A1 | 7/2008 | Gudmundson et al. | |
| 2008/0240578 A1 | 10/2008 | Gudmundson et al. | |
| 2008/0312768 A1 | 12/2008 | Ewing et al. | |
| 2009/0060135 A1 | 3/2009 | Morton | |
| 2009/0146061 A1 | 6/2009 | Manneschi | |
| 2009/0168963 A1 | 7/2009 | Harding | |
| 2009/0196396 A1 | 8/2009 | Doyle et al. | |
| 2010/0027741 A1 | 2/2010 | Doyle et al. | |
| 2011/0007870 A1 * | 1/2011 | Roux et al. | 378/57 |

FOREIGN PATENT DOCUMENTS

| | | |
|---|---|---|
| CA | 2623812 | 5/2007 |
| CA | 2676913 | 11/2010 |
| CA | 2666838 | 12/2010 |
| GB | 2420683 | 5/2006 |
| GB | 2 441 551 | 3/2008 |
| JP | 2006-214725 | 8/2006 |
| WO | WO 03/052398 | 6/2003 |
| WO | WO 2006/119603 | 11/2006 |
| WO | PCT/CA2007/001658 | 1/2008 |
| WO | PCT/CA2007/001749 | 1/2008 |
| WO | WO 2008/009134 | 1/2008 |
| WO | WO 2008/034232 | 3/2008 |
| WO | PCT/CA2007/001658 | 9/2008 |
| WO | PCT/CA2008/001591 | 11/2008 |
| WO | PCT/CA2007/001658 | 12/2008 |
| WO | PCT/CA2008/001721 | 12/2008 |
| WO | PCT/CA2008/001792 | 12/2008 |
| WO | W02009/024818 | 2/2009 |
| WO | PCT/CA2008/002025 | 6/2009 |
| WO | PCT/CA2009/000395 | 7/2009 |
| WO | PCT/CA2009/000401 | 8/2009 |
| WO | W02009/127353 | 10/2009 |
| WO | PCT/CA2009/000811 | 11/2009 |
| WO | WO 2010/028474 A1 | 3/2010 |
| WO | PCT/CA2008/001721 | 4/2010 |
| WO | PCT/CA2010/000916 | 9/2010 |
| WO | PCT/CA2010/001200 | 11/2010 |
| WO | W02010/145016 | 12/2010 |
| WO | PCT/CA2009/000401 | 1/2011 |

OTHER PUBLICATIONS

Office Action mailed on Jul. 10, 2009 in connection with Canadian Patent Application 2,666,838.

Office Action mailed on Nov. 3, 2009 in connection with Canadian Patent Application 2,666,838.

Office Action mailed on Jan. 28, 2010 in connection with Canadian Patent Application 2,676,913.

Freud et al., "Simulation of X-ray NDT Imaging Techniques", http://www.ndt.net/article/wcndt00/papers/idn256/idn256.htm, Dec. 3, 2009.

Xie et al., "Simulation of X-ray Imaging Systems for Luggage Inspection", The Bradley Department of Electrical and Computer Engineering, Virginia Polytechnic Institute and State University, Blacksburg Virginia 26061-0111, p. 248-253.

Office Action mailed on Jul. 29, 2009 in connection with Canadian Patent Application 2,651,728.

Office Action mailed on Jul. 10, 2009 in connection with Canadian Patent Application 2,666,838.

Office Action mailed on Nov. 3, 2009 in connection with Canadian Patent Application 2,666,838.

Office Action mailed on Jan. 28, 2010 in connection with Canadian Patent Application 2,676,913.

Freud et al., "Simulation of X-ray NDT Imaging Techniques", Proceedings of the 15th World Conference on Non-Destructive Testing, Rome, Oct. 15-21, 2000, http://www.ndt.net/article/wendt00/papers/idn256/idn256.htm, pages consulted on Dec. 3, 2009.

Xie et al., "Simulation of X-ray Imaging Systems for Luggage Inspection", Second Explosives Detection Symposium and Aviation Security Conference, Nov. 12-15, 1996, p. 248-253.

Benjamin, R., "Object-Based 3D X-Ray Imaging for Second-line Security Screening", London, 1995, (Abstract).

PinPoint TM Threat Identification Software, http://www.guardiantechintl.com/security.php?npage=pinpoint, Jul. 25, 2005.

"Secure Flight Passenger Screening Program", http://www.globalsecurity.org/security/systems/passenger_screen.htm, Oct. 28, 2005.

Optosecurity, "Security Technology Overview: Advanced Vehicle Verification & Threat Identification", 1 p.

Airport Magazine, Solutions, Products, Services, vol. 7, Mar. 2006, 5 p.

International Preliminary Report on Patentability completed on Feb. 1, 2010 in connection with International Patent Application No. PCT/CA2008/001792, 3 pages.

Office Action issued by the Canadian Intellectual Property Office on Jan. 28, 2010 in connection with Canadian Patent Application No. 2,666,838, 5 pages.

Office Action issued by the Canadian Intellectual Property Office on Mar. 2, 2010 in connection with Canadian Patent Application No. 2,676,903, 4 pages.

Office Action issued by the Canadian Intellectual Property Office on Mar. 19, 2010 in connection with Canadian Patent Application No. 2,651,728, 2 pages.

Office Action issued by the Canadian Intellectual Property Office on Mar. 31, 2010 in connection with Canadian Patent Application No. 2,690,163, 3 pages.

Page, D. L. et al., "Perception-based 3D Triangle Mesh Segmentation Using Fast Marching Watersheds.", Proc. Intl. Conf. on Computer Vision and Pattern Recognition, vol. II, pp. 27-32, Madison, WI, Jun. 2003.

Office Action mailed on Aug. 12, 2010 in connection with U.S. Appl. No. 12/311,522, 30 pages.

Office Action mailed on Aug. 31, 2010 in connection with Canadian patent application 2,690,831, 2 pages.

Office Action mailed on Aug. 31, 2010 in connection with Canadian patent application 2,692,662, 3 pages.

Office Action mailed on Sep. 30, 2010 in connection with U.S. Appl. No. 12/311,031, 23 pages.

Office Action mailed on Oct. 6, 2010 in connection with Canadian Patent Application 2,696,031—2 pages.

Office Action mailed on Oct. 29, 2010 in connection with Canadian Patent Application 2,651,728—6 pages.

Office Action mailed on Oct. 28, 2010 in connection with Canadian Patent Application 2,676,903—2 pages.

Office Action mailed on Nov. 2, 2010 in connection with Canadian Patent Application 2,690,163—1 page.

Office Action mailed on Nov. 17, 2010 in connection with Canadian Patent Application 2,709,468—2 pages.

Examiner's Report mailed on Jan. 31, 2011 in connection with Canadian Patent Application 2,697,525—2 pages.

Office Action mailed on Feb. 10, 2011 in connection with U.S. Appl. No. 12/680,622—10 pages.

Office Action mailed on Feb. 9, 2011 in connection with U.S. Appl. No. 12/311,522—11 pages.

Office Action mailed on Mar. 2, 2011 in connection with U.S. Appl. No. 12/311,031—9 pages.

Office Action issued by the Canadian Intellectual Property Office on May 5, 2010 in connection with Canadian Patent Application No. 2,676,913, 2 pages.

Office Action issued by the Canadian Intellectual Property Office on May 14, 2010 in connection with Canadian Patent Application No. 2,690,831, 3 pages.

Office Action issued by the Canadian Intellectual Property Office on Jun. 7, 2010 in connection with Canadian Patent Application No. 2,692,662, 3 pages.

Office Action issued by the Canadian Intellectual Property Office on Jun. 28, 2010 in connection with Canadian Patent Application No. 2,697,525, 3 pages.

Office Action issued by the Canadian Intellectual Property Office on Jun. 30, 2010 in connection with Canadian Patent Application No. 2,696,031, 2 pages.

Examiner's Report mailed on Mar. 29, 2011 in connection with Canadian Patent Application 2,725,626—5 pages.

Examiner's Report mailed on Mar. 29, 2011 in connection with Canadian Patent Application 2,690,831—2 pages.

Examiner's Report mailed on May 2, 2011 in connection with Canadian patent application 2,692,662-3 pages.

European Search Report mailed on Jun. 9, 2011 in connection with European patent application No. EP2007815851.6-6 Pages.

Gao et al., "Application of X-ray CT to liquid security inspection: System analysys and beam hardening correction", Nuclear Instruments & Methods in Physics Research, Section-A:Accelerators, Spectrometers, Detectors and Associated Equipement, Elsevier, Amsterdam, NL, vol. 579, No. 1, pp. 395-399, Aug. 8, 2007.

Office Action mailed on Apr. 20, 2011 in connection with U.S. Appl. No. 12/311,031-20 pages.

Notice of allowance mailed on May 6, 2011 in connection with U.S. Appl. No. 12/311,522-7 pages.

Notice of allowance mailed on May 6, 2011 in connection with U.S. Appl. No. 12/680,622-8 pages.

* cited by examiner

TRAY FOR ASSESSING THE THREAT STATUS OF AN ARTICLE AT A SECURITY CHECK POINT

CROSS REFERENCE TO RELATED APPLICATION

The present application is a continuation claiming the benefit of priority under 35 USC §120 based on PCT International Patent Application No. PCT/CA2007/001749 filed Oct. 1, 2007 and designating the United States; which for the purposes of the United States claims the benefit of priority under 35 USC §119 e) based on U.S. provisional patent application Ser. No. 60/827,784 filed on Oct. 2, 2006 by Aidan Doyle et al.

The contents of the above-referenced document are incorporated herein by reference.

FIELD OF THE INVENTION

The present invention relates to technologies for assessing the threat status of materials by means of penetrating radiation such as X-rays. More specifically, the invention relates to reference device, in particular a tray that supports the material while the material is being subjected to penetrating radiation, with one or more areas that can be used as a reference during the identification process of the material. The invention has numerous applications, in particular it can be used for scanning hand carried baggage at airport security check points.

BACKGROUND OF THE INVENTION

Some liquid or combinations of liquid and other compounds may cause enough damage to bring down an aircraft. As no reliable technology-based solution currently exists to adequately address this threat, authorities have implemented a ban of most liquid, gels and aerosols in cabin baggage.

As a result, there have been disruptions in operations (e.g., a longer screening process; changed the focus for screeners; additional line-ups), major inconveniences for passengers (as well as potential health hazards for some) and economic concerns (e.g., increased screening costs; lost revenues for airlines and duty free shops; large quantities of confiscated—including hazardous—merchandise to dispose of), and so on.

Clearly, there is a need to provide a technology-based solution to address the threat of fluids that are flammable, explosive or commonly used as ingredients in explosive or incendiary devices.

SUMMARY OF THE INVENTION

As embodied and broadly described herein, the invention provides a tray for holding a material while the material is being subjected to penetrating radiation. The tray has a surface on which the material rests while subjected to penetrating radiation. The surface has at least two areas, namely a first area and a second area, the first and second areas characterized by first and second signatures, respectively when exposed to penetrating radiation, wherein the first signature is different from the second signature. The second area constitutes a reference. This reference allows identifying the material based at least in part on a comparison between the signature of the material to penetrating radiation and the second signature.

In a specific and non limiting example of implementation, the tray can be used during security screening of liquid products at security checkpoints. The screening process includes requesting passengers with hand-carried baggage to remove from the baggage liquid products and place the liquid products in the tray. The tray with the liquid products is then inserted in an X-ray imaging system to perform an X-ray inspection. The image data generated during the X-ray inspection is processed by a computer. The computer compares the X-ray signature of the reference area to the X-ray signature of the liquid product. If the X-ray signature of the reference area is known to correspond to the X-ray signature of a liquid product that does not present a security threat, such as a bottle of plain water, and the X-ray signature of the liquid product that is being screened matches the X-ray signature of the reference, then in all likelihood the liquid product that is being screened is a safe product.

Generally speaking, X-rays are typically defined as electromagnetic radiation having wavelengths that lie within a range of 0.001 to 10 nm (nanometers) corresponding to photon energies of 120 eV to 1.2 MeV. Although the electromagnetic radiation referred to primarily throughout this description are X-rays, those skilled in the art will appreciate that the present invention is also applicable to electromagnetic radiation having wavelengths (and corresponding photon energies) outside this range.

For the purpose of this specification "liquid" refers to a state of matter that is neither gas nor solid and that generally takes the shape of the container 102 in which it is put. This definition would, therefore encompass substances that are pastes or gels, in addition to substances having a characteristic readiness to flow. For instance, toothpaste, and other materials having the consistency of toothpaste would be considered to fall in the definition of "liquid".

As embodied and broadly described herein, the invention also provides a tray for holding a liquid product during an X-ray inspection of the liquid product performed to determine if the liquid product presents a security threat. The tray has a surface on which the liquid product rests while being subjected to X-rays. The surface has at least two areas, namely a first area and a second area, the first area characterized by a first X-ray signature and the second area characterized by a second X-ray signature that is different from the first X-ray signature. The second X-ray signature matches the X-ray signature of a liquid product, wherein the liquid product includes a container 102 holding a liquid material, the liquid material being selected from the group consisting of water, carbonated beverage, fruit juice, toothpaste and a cosmetic liquid.

As embodied and broadly described herein, the invention also relates to a method for performing security screening at a security checkpoint. The method includes the steps of placing a liquid product in a tray which has a reference area and performing an X-ray inspection of the tray holding the liquid product. The method further comprises comparing the X-ray signature of the liquid product to the X-ray signature of the reference area and determining if the liquid product is a security threat based at least in part on results obtained by comparing the X-ray signature of the liquid product to the X-ray signature of the reference area.

As embodied and broadly described herein, the invention also includes a security screening system to determine if an article presents a security threat. The screening system comprises an input for receiving image data conveying an image of the article and of a reference area produced when the article and the reference area are subjected to penetrating radiation. The screening system further has a logic module for:

a) processing the image data to compare a signature to penetrating radiation of the article to a signature to penetrating radiation of the reference area;

b) processing the image data at least in part based on results obtained by processing the image data in step a) to assess if the article poses a security threat.

As embodied and broadly described herein the invention also provides a tray for holding an article while the article is being subjected to penetrating radiation. The tray having a surface on which the article rests while subjected to penetrating radiation, that surface including at least one area which when exposed to penetrating radiation produces a predetermined signature. The tray also has a machine readable indicia conveying information associated with the predetermined signature.

As embodied and broadly described herein, the invention further provides a security screening system to determine if an article presents a security threat. The screening system having an input for receiving image data conveying an image of the article and of a reference area produced when the article and the reference area are subjected to penetrating radiation. The screening system further has a logic module for:
  a. deriving a nominal signature of the reference area to penetrating radiation;
  b. processing the image data to derive an actual signature to penetrating radiation of the reference area;
  c. comparing the nominal signature to penetrating radiation to the actual signature to penetrating radiation;
  d. processing the image data at least in part based on results obtained in step c) to assess if the article poses a security threat.

As embodied and broadly described herein, the invention further provides a security system for implementation at a check point to screen hand carried baggage for articles that potentially pose a security threat. The security system including a set of trays for receiving the hand carried baggage of passengers as the passengers arrive at the check point, and an X-ray apparatus. The X-ray apparatus has:
  a. a screening area;
  b. a conveyor belt on which the trays with hand carried baggage are placed, the conveyor belt being movable to advance the trays with hand carried baggage through the screening area where the trays and the hand carried baggage are subjected to X-rays.

At least one of the trays in the set of trays having a reference area characterized by a nominal X-ray signature and the X-ray apparatus further including a logic module for:
  i) processing image data of the at least one tray to derive from the image data an actual X-ray signature of the reference area;
  ii) performing a comparison between the actual X-ray signature and the nominal X-ray signature and processing the image data of the at least one tray at least in part based on results of the comparison to assess if hand carried baggage contains articles that pose a security threat.

As embodied and broadly described herein, the invention also includes a security screening system to determine if an article presents a security threat. The screening system having:
  a) an X-ray imaging system;
  b) a reference device including at least one reference area characterized by a nominal X-ray signature;
  c) the X-ray imaging system having a logic module for:
    i) processing X-ray image data generated when the reference device is subjected to X-rays to determine if the nominal X-ray signature of the reference area matches an actual X-ray signature of the reference area;
    ii) processing the X-ray image data at least in part based on results obtained when processing the X-ray image data to determine if the nominal X-ray signature of the reference area matches the actual X-ray signature of the reference area to assess if an article X-rayed by the X-ray imaging system at the same time as the reference device or thereafter poses a security threat.

As embodied and broadly described herein, the invention also includes a method for performing security screening at a checkpoint. The method includes the steps of placing a liquid product in a tray having at least two reference areas manifesting respective X-ray signatures when exposed to X-rays, the X-ray signatures being distinguishable from one another. The method also includes performing an X-ray inspection of the tray while the tray holds the liquid product, the X-ray inspection including deriving the X-ray signatures. The method further includes the step of determining if the liquid product is a security threat based at least in part on the X-ray signatures.

BRIEF DESCRIPTION OF THE DRAWINGS

A detailed description of examples of implementation of the present invention is provided hereinbelow with reference to the following drawings, in which.

Figure 1:
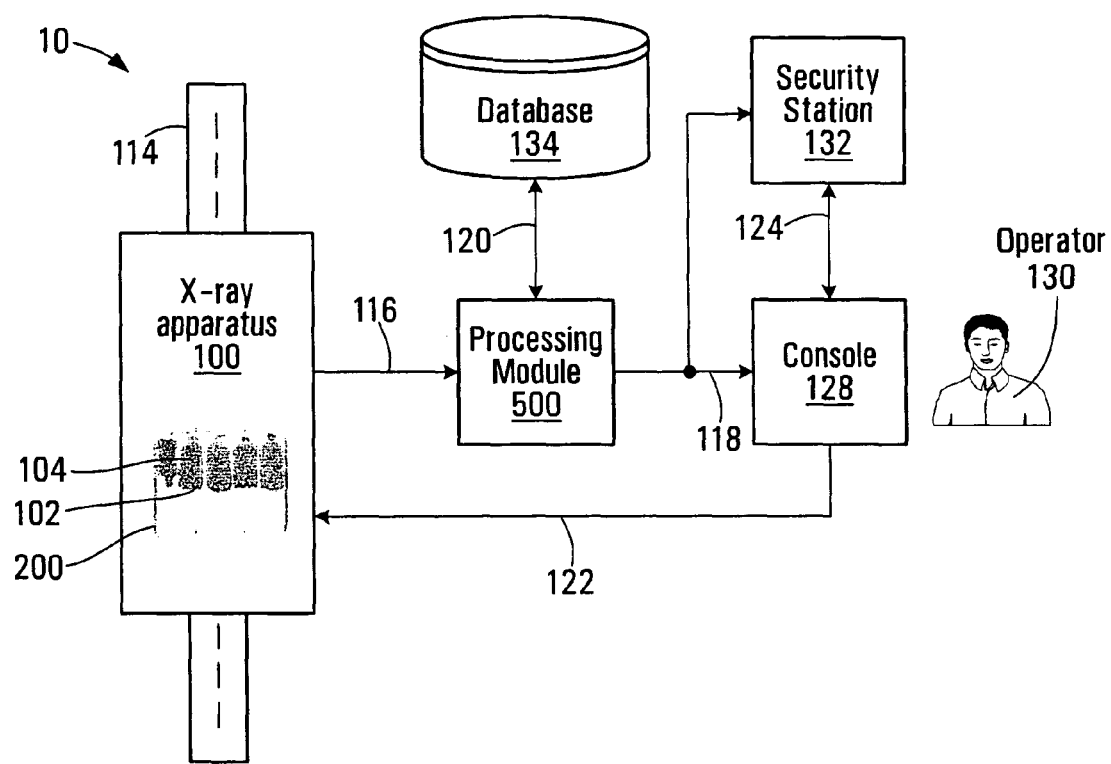
FIG. 1 is a block diagram of an apparatus using X-rays to scan hand carried baggage at a security check point, according to a non-limiting example of implementation of the invention.

In the drawings, embodiments of the invention are illustrated by way of example. It is to be expressly understood that the description and drawings are only for purposes of illustration and as an aid to understanding, and are not intended to be a definition of the limits of the invention.

DETAILED DESCRIPTION

With reference to FIG. 1, there is shown a specific non-limiting example of a system 10 for use in screening containers with liquids, in accordance with a non-limiting embodiment of the present invention. The system 10 comprises an X-ray apparatus 100 that applies an X-ray screening process to a material such as a liquid 104 contained in a container 102 that is located within a screening area of the X-ray apparatus 100. In an airport setting, a passenger may place the container 102 in a tray which is then placed onto a conveyor 114 that causes the container 102 to enter the screening area of the X-ray apparatus 100. The X-ray apparatus 100 outputs an image signal 116 to a processing module 500. The processing module then processes the image data conveyed by the signal 116.

The processing module 500 may be co-located with the X-ray apparatus 100 or it may be remote from the X-ray apparatus 100 and connected thereto by a communication link, which may be wireless, wired, optical, etc. The processing module 500 processes the image data and executes a method to produce a threat assessment 118. The processing module 500 may be implemented using software, hardware, control logic or a combination thereof.

The threat assessment 118 is provided to a console 128 and/or to a security station 132, where the threat assessment 118 can be conveyed to an operator 130 or other security personnel. The console 128 can be embodied as a piece of equipment that is in proximity to the X-ray apparatus 100, while the security station 132 can be embodied as a piece of equipment that is remote from the X-ray apparatus 100. The console 128 may be connected to the security station 132 via a communication link 124 that may traverse a data network (not shown).

The console 128 and/or the security station 132 may comprise suitable software and/or hardware and/or control logic to implement a graphical user interface (GUI) for permitting interaction with the operator 130. Consequently, the console 128 and/or the security station 132 may provide a control link 122 to the X-ray apparatus 100, thereby allowing the operator 130 to control motion (e.g., forward/backward and speed) of the conveyor 114 and, as a result, to control the position of the container 102 within the screening area of the X-ray apparatus 100.

In accordance with a specific non-limiting embodiment the X-ray apparatus 100 is a dual-energy X-ray apparatus 100. However, persons skilled in the art will appreciate that the present invention is not limited to such an embodiment. Such dual-energy X-ray apparatus 100 has a source which emits X-rays at two distinct photon energy levels, either simultaneously or in sequence. Example energy levels include 50 keV (50 thousand electron-volts) and 150 keV, although persons skilled in the art will appreciate that other energy levels are possible.

The processing module 500 receives the image signal 116 and processes the signal to determine if the liquid 104 in the container 102 poses a security threat. The determination can include an explicit assessment as to weather the liquid 104 is a threat or not a threat. Alternatively, the determination can be an identification of the liquid 104 or the class of materials to which the liquid 104 belongs, without explicitly saying whether the liquid 104 is threatening or not threatening. For example, the processing module can determine that the liquid 104 is "water" hence the operator 130 would conclude that it is safe. In a different example, the processing module 500 determines that the liquid 104 belongs to a class of flammable materials, in which case the operator 130 would conclude that it would be a security threat. Also, the determination can be such as to provide an explicit threat assessment and at the same time also provide an identification of the liquid 104 in terms of general class of materials or in terms of a specific material. The results of the determination are conveyed in the threat assessment signal 118 which is communicated to the console 128 and/or the security station 132 where it is conveyed to the operator 130.

Figure 5:
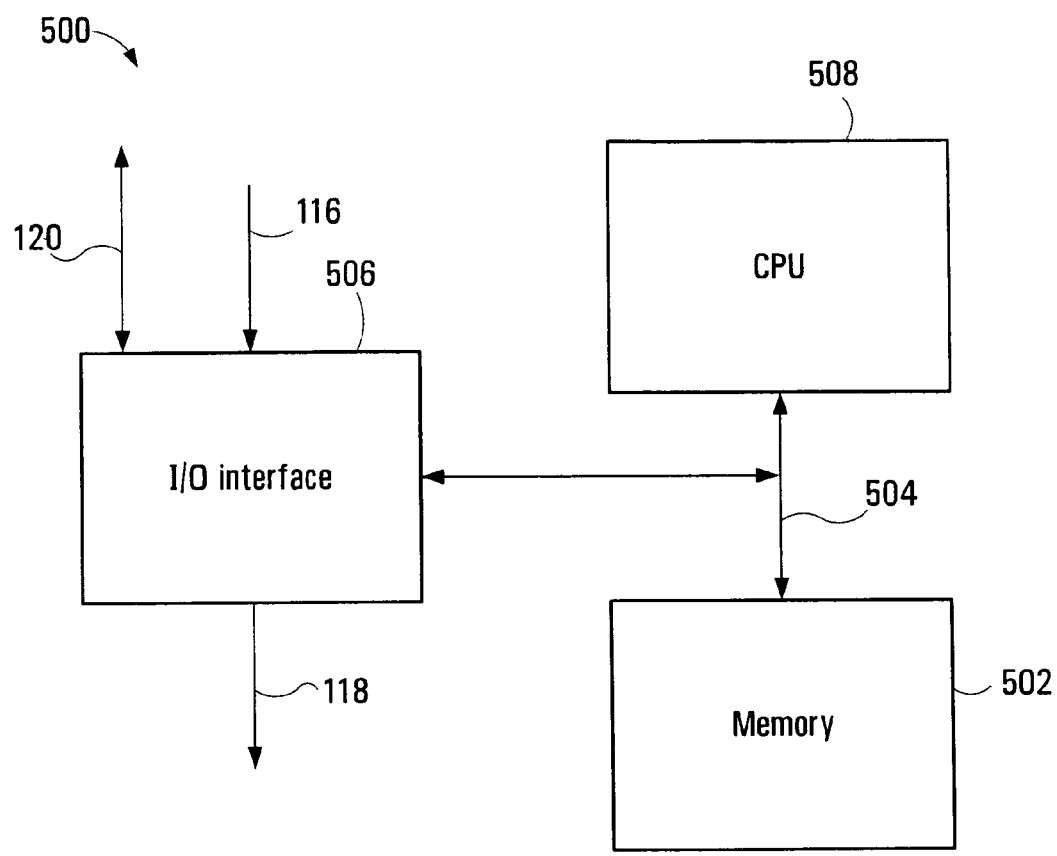
FIG. 5 is a more detailed block diagram of the processing module of the apparatus shown in FIG. 1.

FIG. 5 is a high level block diagram of the processing module 500. The processing module 500 has a Central Processing Unit (CPU) 508 that communicates with a memory 502 over a data bus 504. The memory 502 stores the software that is executed by the CPU 508 and which defines the functionality of the processing module 500. The CPU 508 exchanges data with external devices through an Input/Output (I/O) interface 506. Specifically, the image signal 116 is received at the I/O interface 506 and the data contained in the signal is processed by the CPU 508. The threat assessment signal 118 that is generated by the CPU 508 is output to the console 128 and/or the security station 132 via the I/O interface 506.

Figure 2:
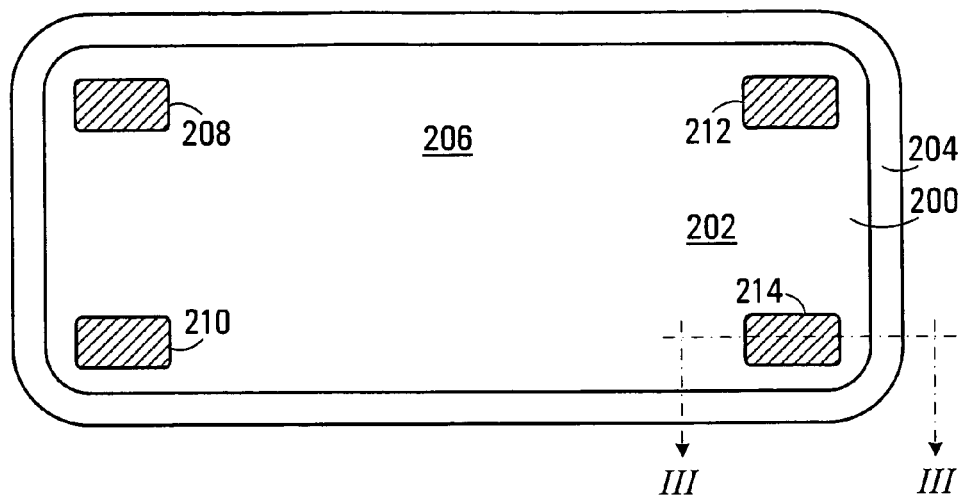
FIG. 2 is a plan view of a tray for carrying materials as they undergo security screening, according to a non-limiting example of implementation of the invention.

In a specific example of implementation, the system 10 is used in conjunction with a tray 200 shown in FIG. 2 to perform security screening of liquid products. The tray 200 is used as a receptacle in which objects to be screened, such as liquid products or other materials or articles, are placed and put on the conveyor belt of the X-ray imaging system 10. To facilitate the identification of the liquid product or any other article placed in the tray 200 and/or to perform threat assessment of the liquid product or of any other article, the tray 200 is provided with one or more distinct areas that have X-ray signatures which can be used as references against which the X-ray signatures of the liquid product or any other article can be compared. The comparison can be made in order to perform an identification of the liquid product, for instance determine what its specific composition is. The comparing can also be made simply to find out if the liquid product poses a security threat, without necessarily determining its precise identity.

The tray 200 defines a surface 202 which is generally flat and on which the liquid product that is being screened rests. In the example shown in the drawings, the surface is shaped as a rectangle with rounded corners. Evidently, different shapes or configurations can be used without departing from the spirit of the invention.

The surface 202 is provided with raised edges or rim 204 that extend in a continuous fashion around the periphery of the surface 202. The raised edges 204 prevent articles placed in the tray 200 to fall outside during the screening operation. The height of the raised edges 204 can vary without departing from the spirit of the invention.

The surface 202 defines five distinct areas. The first area 206 is the base material from which the tray 200 is made. That material may be any synthetic material that has the required strength and durability characteristics for the intended application. The four additional distinct areas 208, 210, 212 and 214 are in the form of inserts that are placed in respective receptacles in the base material 206. The areas 208, 210, 212 and 214 are in the shape of rectangles placed near respective corners of the tray 200. It is to be expressly noted that the shape, placement in the tray 200 and the number of the areas 208, 210, 212 and 214 can vary without departing from the spirit of the invention.

The areas 206, 208, 210, 212 and 214 are distinct in that they have different X-ray signatures. Accordingly, when an X-ray image is taken of the tray 200 alone, the areas 206, 208, 210, 212 and 214 will show up differently in the image. Preferably, the area 206 is made of material that is selected to provide a weak X-ray signature such as to limit its effect in the image and thus make the other articles that are put on the tray 200 more visible.

The areas 208, 210, 212 and 214 are made from substances that have X-ray signatures that are similar to the X-ray signatures of liquid products or other articles that are likely to be placed in the tray 200 during a security screening operation. In this fashion, the areas 208, 210, 212 and 214 constitute references against which the X-ray signatures of the articles placed in the tray 200 can be compared for identification purposes and/or to determine their threat status.

For example, in the context of a screening operation performed at an airport passengers are likely to bring, in hand carried baggage, liquid products. Those liquid products are typically for human consumption or toiletries for personal grooming or dressing. Examples of liquid products for human consumption include water, carbonated beverages and fruit juices, among others. Examples of toiletries include cosmetic liquids such as toothpaste, liquid soap (shampoo for instance), creams, deodorants, sun care products and hair care products, among others.

Reference areas 208, 210 212 and 214 in the tray 200 may be provided for some of those articles that are the most common such as to facilitate their identification and/or the assessment of their threat status. For instance if the tray 200 is designed in such a way as to be able to practically use only four reference areas, such as the areas 208, 210, 212 and 214 the materials from which the areas 208, 210, 212 and 214 are selected such as to mimic the X-ray responses of the four most common liquid products that passengers are likely to bring in their hand carried baggage. Consider for the purpose of this example that among all the liquid products that are brought the following ones are observed the most often:

1. Water bottle;
2. Carbonated beverage sold under the trademark "Coke";
3. Toothpaste commercialized under the trademark "Crest";
4. Skin-care cream made by the company "RoC".

Accordingly, the areas 208, 210, 212 and 214 are made of materials that have X-ray signatures that are similar or identical to the X-ray signatures to the respective liquid products above. In this fashion, if a water bottle is placed on the tray and scanned by the apparatus 100, the X-ray image will show that the X-ray signatures of the water bottle and of the area 208 are the same. Since the area 208 is known to have an X-ray signature that is equivalent to water, the match between both X-ray signatures can be used to establish that the liquid 104 in the container 102 is in fact water.

Figure 3:
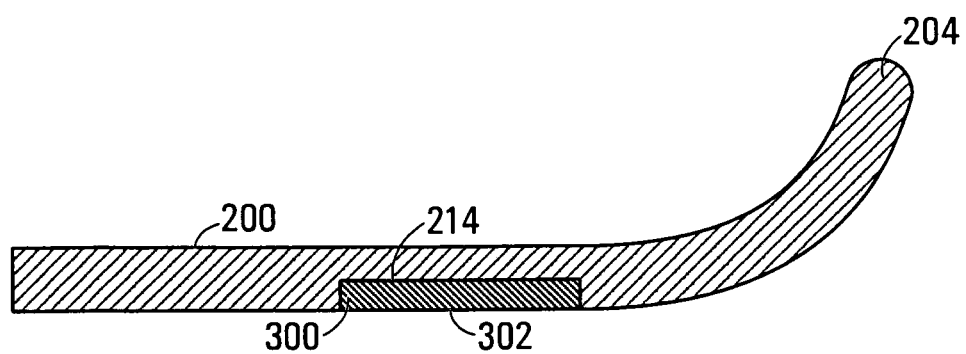
FIG. 3 is a cross-sectional view taken along lines 3-3 in FIG. 2.

More specifically, each area 208, 210, 212 and 214 can be made from a material whose X-ray signature is the same or very similar to the X-ray signature of the liquid product associated therewith. This solution can be implemented by providing an insert made from the selected material that is placed in the base material 206 of the tray 200. This feature is best shown in FIG. 3 which is a cross-sectional view of the tray 200 taken at the level of the area 214. Specifically, the base material of the tray is provided with a receptacle 300 in which is placed an insert 302 defining the area 214. To ensure a snug fit for the insert 302 is manufactured to be of about the same size as the receptacle 300. In this fashion, the insert 302 is held in the receptacle 300 as a result of friction fit. Evidently, other mounting methods can be provided without departing from the spirit of the invention. One possible variant is to use a fastening mechanism that would allow the insert 302 to be removed. In this fashion, the insert 302 can be replaced with another insert, if the original insert is damaged or if it is deemed appropriate to change the X-ray response of the area 214.

The main driver in selecting the material from which the insert 302 is to be made is to provide an X-ray signature that matches the X-ray signature of the liquid product associated with the area 214. In a specific and non-limiting example of implementation the X-ray signature of an object that appears in an X-ray image can be expressed as the gray level intensity of the pixels in the portion of the image that depicts the object. This case assumes that the gray level intensity, which represents the degree of attenuation of the X-rays as they pass through the object, is relatively uniform across the object. This is the case when the object is made of material that is homogenous and thus attenuates the X-rays uniformly. Most liquid products would fall into that category. Another example is a situation when the object is not homogeneous and thus creates a certain gray level profile or pattern. The pattern may be regular or irregular.

Generally speaking, the X-ray signature of a material or object is the response produced by the material when the material interacts with X-rays. There are a number of interactions possible, such as:

The Rayleigh scattering (coherent scattering)
The photoelectric absorption (incoherent scattering)
The Compton scattering (incoherent scattering)
The pair production
Diffraction The photoelectric absorption of X-rays occurs when an X-ray photon is absorbed, resulting in the ejection of electrons from the shells of the atom, and hence the ionization of the atom. Subsequently, the ionized atom returns to the neutral state with the emission of whether an Auger electron or an X-ray characteristic of the atom. This subsequent X-ray emission of lower energy photons is however generally absorbed and does not contribute to (or hinder) the X-ray image making process. This type of X-ray interaction is dependent on the effective atomic number of the material or atom and is dominant for atoms of high atomic numbers. Photoelectron absorption is the dominant process for X-ray absorption up to energies of about 25 keV. Nevertheless, in the energy range of interest for security applications (for today's state-of-the-art security screening systems, the energy levels commonly utilized lie between 50 keV and 150 keV), the photoelectric effect plays a smaller role with respect to the Compton scattering, which becomes dominant.

Compton scattering occurs when the incident X-ray photon is deflected from its original path by an interaction with an electron. The electron gains energy and is ejected from its orbital position. The X-ray photon looses energy due to the interaction but continues to travel through the material along an altered path. Since the scattered X-ray photon has less energy, consequently it has a longer wavelength than the incident photon. The event is also known as incoherent scattering because the photon energy change resulting from an interaction is not always orderly and consistent. The energy shift depends on the angle of scattering and not on the nature of the scattering medium. Compton scattering is proportional to material density and the probability of it occurring increases as the incident photon energy increases.

The diffraction phenomenon of the X-rays by a material with which they interact is related to the scattering effect described earlier. When the X-rays are scattered by the individual atoms of the material, the scattered X-rays may then interact and produce diffraction patterns that depend upon the internal structure of the material that is being examined.

As to the pair production interaction, it refers to the creation of an elementary particle and its antiparticle from an X-ray photon.

That response produced by a material as it interacts with X-rays can be expressed in terms of gray level value, gray level patterns seen in the X-ray image or other physical manifestation.

The selection of the proper material for making the inserts 302 for the various areas 208, 210, 212 and 214 can be made by in a number of ways. One possibility is to pick materials that have a composition that is likely to provide a similar X-ray signature than the material associated with the area 208, 210, 212 and 214. If adjustments are necessary, the thickness of the insert 302 can be varied so as to adjust its signature accordingly.

The insert may or may not be made from a homogenous material. An example of a non-homogeneous structure is an assembly of layers made from different materials that in combination would provide the desired X-ray signature. Another example is a mixture of different materials intended to create a pattern in the X-ray image. The person skilled in the art will recognize that an almost infinite number of different X-ray signatures can be developed by selecting the proper material or materials and by mixing or assembling them in the appropriate manner.

Examples of materials that can be used include plastics such as polyethylene, polypropylene or others. Their density or composition can be varied to obtain the desired X-ray signature.

The process for performing a security screening operation on the apparatus of FIG. 1 and involving the tray 200 will now be described in greater detail, in connection with FIG. 6.

Figure 4:
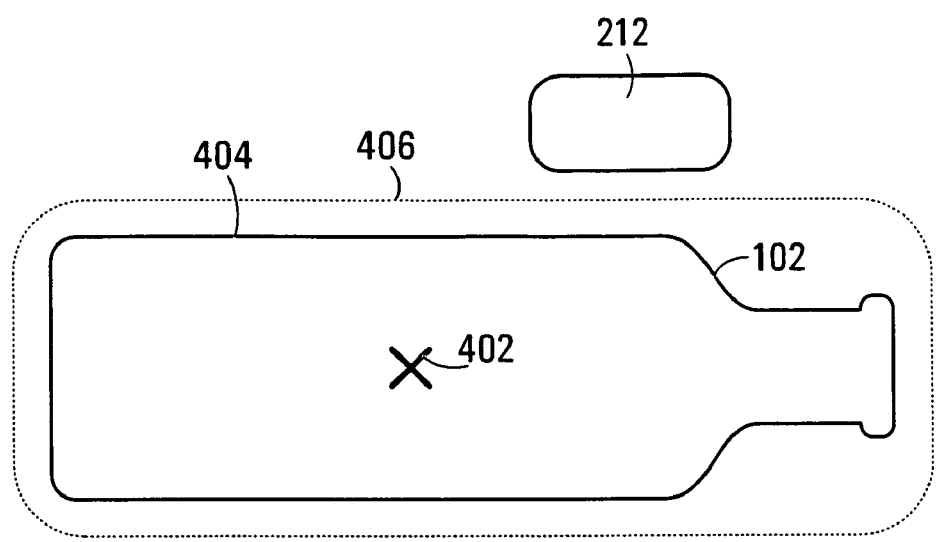
FIG. 4 is an X-ray image of a liquid container 102 shown on a graphical user interface.
Figure 6:
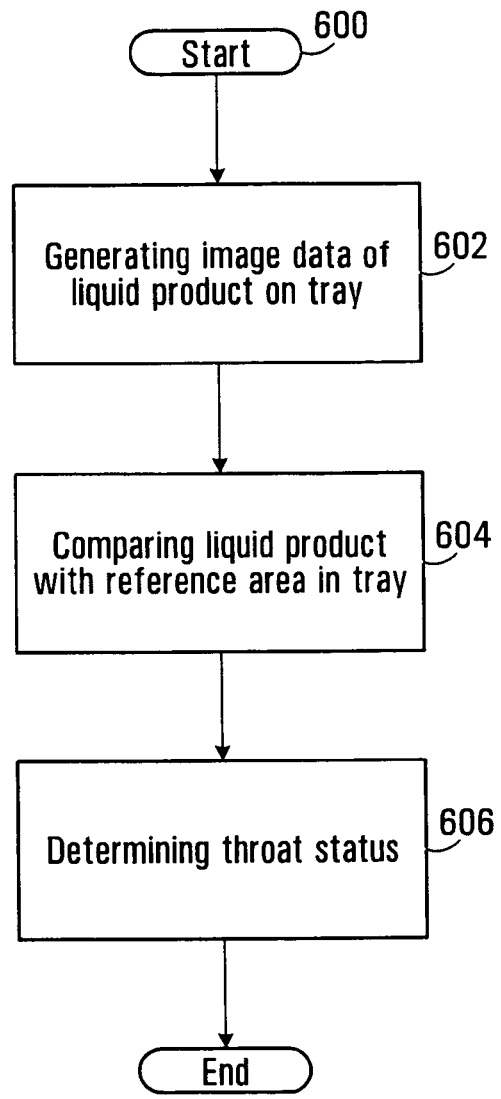
FIG. 6 is a flowchart illustrating the process implemented by the apparatus of FIG. 1 to perform security screening.

FIG. 6 is a flowchart of the method that is implemented at a security checkpoint at an airport or any other suitable location to screen hand carried baggage that relies on one example of implementation of the liquid screening process described earlier. The security checkpoint where this method is implemented would use an X-ray imaging system of the type shown in FIG. 1 for example. At step 600 the passenger approaching the checkpoint is requested by security personnel or shown directives appearing on a board or any suitable display to remove any containers holding liquids that may be present in the hand carried baggage. The containers are placed on tray 200 and put on the conveyor belt of the X-ray imaging system. At step 602 an X-ray image is taken of the liquid product as it is carried on the tray 200. The X-ray image is depicted on a monitor allowing the operator of the X-ray imaging system to examine X-ray image. An example of the X-ray image is shown in FIG. 4 (note that for clarity FIG. 4 shows the image purely in black and white without any shades of gray). The image shows the liquid product, in particular the container 102 and one of the areas, say the area 212.

Assume that the liquid product is a water bottle and the area 212 is designed as a reference for water, in other words it X-ray signature matches the X-ray signature of a water bottle. By performing a comparison between the two X-ray signatures it is possible to determine the identity of the product in the container 102. Specifically, if the X-ray signatures match it is highly probable that the liquid product is in fact water. The comparison process, which is shown at step 604 in FIG. 6, can be done in two ways. The first is by the human operator alone which observes both X-ray signatures visually and determines if they match. This is likely to be fairly imprecise; however it could work when the X-ray signatures are fairly distinctive such as when they are unique and easily recognizable patterns.

The other possibility to perform the X-ray signature comparison is to do it automatically by performing an image analysis. The image analysis can be done via image analysis software executed by the processing module 500. The image analysis software processes the image portions that contain the area 212 and the container 102 to determine the likelihood of X-ray signature match between them.

More specifically, the software executed by the processing module 500 starts by identifying where are the edges of the container 102 in circumscribing the relevant image portion that is to be compared to the area 212. The edge detection process includes the following steps:

1. The first step is to locate a portion of the edge. The software searches for detectable gray level transition that occurs in the image as a result of the container 102 wall. Specifically, due to the structure/material of the container 102 wall a well defined gray level transition will show in the image. To facilitate the edge detection process it is possible to provide the operator console 128 with user interface tools that will allow the operator to designate in the X-ray image the general area where the container 102 is located. In this fashion, the software will start the image analysis in an area of the image that is known to contain the image of a container 102. Once the X-ray image is shown to the operator 130, he or she uses a tool to indicate where a container 102 lies. The operator 130 first identifies visually the container 102 to be processed. The operator 130 then uses a user interface tool to designate the container 102 to the software. The tool may be any suitable user interface tool such as pointer device such as a mouse or a touch sensitive feature allowing the operator 130 to touch the screen at the area of interest. When the pointer device is activated at the location 402, which by convention is deemed to correspond generally to the center of the container 102, the activation will produce location data. The location data identifies an area in the image where the container 102 resides. The software uses the location data to select the portion of the image data to which the location data points to and starts the image analysis in that area. The software operates with the assumption that the container's 102 features that will be identified should have some degree of symmetry about that location. The software scans the image data by moving further away from the location 402 until a sharp gray level gradient is located that corresponds to a container 102 edge. In principle, since the location 402 is in the center of the container 102 then a container 102 edge should be detected in the image at two places equally spaced from the location 402.

Another possibility is for the operator to designate with the pointing device specifically the edge of the container 102 that is to be analyzed. For instance, the operator 130 "clicks" the mouse or touches the screen with his/her finger at the location 404 that corresponds to the edge of the container 102.

Yet another possibility is for the operator to perform the designation by "drawing" on the image a zone curtailing the area where the container 102 is located. For instance, the operator 130 can use the pointing device to draw the line 406 around the container 102.

With any one of the methods described earlier, the edge detection software receives operator guidance to perform an image analysis and extract from the image one or more characterizing features of the container 102.

2. The next step of the process is to track the outline of the container 102. As the software has identified a portion of the container's edge, the software logic then starts tracking that edge. The tracking logic tracks the sharp gray level gradient in the image to follow the container's 102 edge.

3. When the container 102 detection process has been completed, the outline of the container 102 can be emphasized to the operator 130, as a final "sanity check". Specifically, the processing module 500 issues commands to the display such that the display visually enhances a portion of the image where the container 102 is located. This makes the container 102 more visible with relation to other objects in the X-ray image. Examples image enhancements include:

a. Colouring or otherwise highlighting the areas of the image that correspond to the portions where the edge has been identified;

b. Coloring or otherwise highlighting the container 102 in its entirety.

c. De-emphasizing the image except the areas where the container 102 lies. This technique does not change the pixels of the X-ray image in the region of the container 102 but changes all the pixels that surround the container's 102 image such as to make the container 102 more visible.

The highlighting process uses the edge detection data obtained by the edge detection software as a result of the X-ray image analysis. The edge detection data defines in the X-ray image the areas where an edge has been identified. The highlighting process then uses this information to manipulate the X-ray image pixels such that the container 102 stands out with relation to its surroundings.

If the edge identification has been done correctly the operator 130 would see the container 102 highlighted. The operator 130 can then apply human judgment on the results. If the edge tracking operation is correct then the results can be accepted and the processing allowed continuing. Otherwise, if the operator 130 sees on the screen a highlighted shape that does not correspond to a container 102 then he/she aborts the operation.

Before the image processing can be initiated it is desirable to designate to the software the image portions to be compared. The designation of the area 212 can be done automatically since that area has a unique and known shape. The software can, therefore, perform an image analysis and search for that particular shape in the image. When several areas exist in the image, the software can identify them all and generate location information for each area 208, 210, 212 and 214.

Alternatively, the operator 130 can designate in the image the areas 208, 210, 212 and 214 by using an appropriate graphical user interface tool, in a similar way to the designation of the container 102.

Once the reference area 212 and the container 102 have been identified in the image, they are compared to determine if there is a match. Generally, this is a two step process. During the first step the X-ray signatures of the reference area 212 and of the container 102 are read. During the second step the X-ray signatures are compared to determine if there is a match.

The X-ray signature is read by performing an image processing operation. The operation is the same for the area 212 and for the container 102 and for the purpose of simplicity only one will be described. The software will process the image data to determine the gray level values at different positions in the area 212. If they are all the same an assumption is then made that the area 212 has an X-ray signature that mimics a homogeneous material. Accordingly, that X-rays signature can then be expressed by the average gray level value of the pixels within the area 212. On the other hand if the gray level values reflect a pattern, then the pattern itself represents the X-ray signature. For instance, a pattern will be produced if the X-ray apparatus 100 can sense X-ray scattering/diffraction.

When the X-ray signatures of the area 212 and of the container 102 have been determined, they are compared to find out if there is a match. In the case of homogeneous materials, the gray level values are compared and if they match within a predetermined tolerance, the X-ray signatures are considered to be matching. The predetermined tolerance can be varied according to the intended application. In instances where a high sensitivity is required, the tolerance will be small and conversely for situations that require less sensitivity a larger tolerance can be used.

When the X-ray signatures are expressed as gray level patterns, the degree of match can be established by using any suitable pattern matching algorithms. Also neural networks can be used to perform pattern matching operations.

An important advantage of performing a comparison between X-ray signatures extracted from the same image data is the elimination of X-ray induced variations in the system response. In this fashion, the system is self-referencing.

In the example described earlier, a comparison was performed between the X-ray signature of the liquid product and the X-ray signature of the area 212. This could work in instances where the tray 200 has a single reference area, however in situations where the tray 200 has more than one reference area it may be difficult to determine which reference area of the set of reference areas on the tray should be compared to the X-ray signature of the liquid product. In this case, it is advantageous to determine the location of each reference area in the tray and read the X-ray signature of each reference area and then compare it with the X-ray signature of the liquid product.

The final step of the processing operation is the determination of the threat status of the liquid product on the basis of X-ray signature comparison. Several possibilities exist.

1. The threat status can be implicitly determined when the X-ray signature comparison allows identifying the liquid product. For example, the operator 130 has operational knowledge that the area 212 has a reference X-ray signature of water, therefore if the there is a match between the X-ray signatures of the area 212 and of the liquid product, the latter can be assumed to be water as well, hence safe to carry on a plane, train or any other public transportation. Conversely, the area 212 can be provided as a reference for a dangerous substance, say hydrogen peroxide. If a match is found, then the liquid 104 in the container 102 is identified as being hydrogen peroxide and the operator concludes that this is a threatening substance.
2. The threat status can be derived without an explicit determination of the identity of the material in the container 102. For instance the area 212 is designed with an X-ray signature to screen for a specific one or a class of substances that are deemed threatening. Therefore, the operator 130 does not need to know what those substances are. If there is a match between the X-ray signature of the area 212 and the X-ray signature of the liquid product, then the operator 130 concludes that the liquid product presents a threat. In a similar fashion, the area 212 with an X-ray signature that screens for "safe" products rather than "unsafe" products will show a match when "safe" products are put in the tray 200. In this case, the match will be used as an indication that the liquid product does not present a safety risk.

In a possible variant, the tray 200 is provided with machine readable and/or human readable indicia to facilitate the liquid product screening operation. Several possibilities exist.

1. The tray 200 can be provided with a human readable identification of the materials that are being screened. For instance, each area 208, 210, 212 and 214 bears a label showing the operator 130 which material is associated with that area. The label may say "water", "orange juice" or any other. The label is visible to the operator 130 such as when the tray 200 and the liquid product it supports is placed in the X-ray apparatus 100 the operator 130 can visually see which one of the reference areas 208, 210, 212 and 214 will need to be compared with the liquid product. Another possibility is to make those labels visible only in the X-ray image. The labels can be created by placing inserts in the tray 200, near the respective areas 208, 210, 212 and 214 which create a contrasting label in the X-ray image. In this fashion, the operator 130 would see the product that is associated with each area 208, 210, 212 and 214 and can manually designate the relevant area 208, 210, 212 and 214 that is to be compared with the liquid product.

2. The tray 200 is provided with machine readable indicia. The machine readable indicia can be in the form of a bar code or any other suitable machine readable code that is provided at an appropriate location in the tray. Preferably, the machine readable indicia are not visible to the human eye but shows on the X-ray image. This can be done by printing the tray surface with inks that create a high degree of contrast in an X-ray image or by placing an insert in the tray that carries the indicia made from a high density material that will easily show in the X-ray image. Examples of the type of information that the indicia conveys, include:

a. The identity of the materials associated with the respective areas 208, 210, 212 and 214. In addition to the identity information the indicia may specify the location in the tray of each area 208, 210, 212 and 214 with respect to a certain reference, which can be the indicia itself. The indicia is read by the image processing software and the information on the identity of the materials, in the case there is a match between the X-ray signatures of one of the areas 208, 210, 212 and 214 and the liquid product on the tray 200 can be displayed to the operator 130 on the same monitor showing the X-ray image or on a different monitor.

b. Information on the threat status. Instead of showing material identity information, the indicia convey information on the threat status.

c. The indicia can be used as an index to search a database that provides additional info to the operator 130 about the liquid product associated with the reference area 208, 210, 212 and 214.

The graphical user interface on the console 128 displays the results of the comparison operation. The information that can be shown includes:

1. The identity of the material;
2. The threat status;
3. The degree of confidence in the assessment based on the degree of match between the X-ray signatures.

Figure 7:
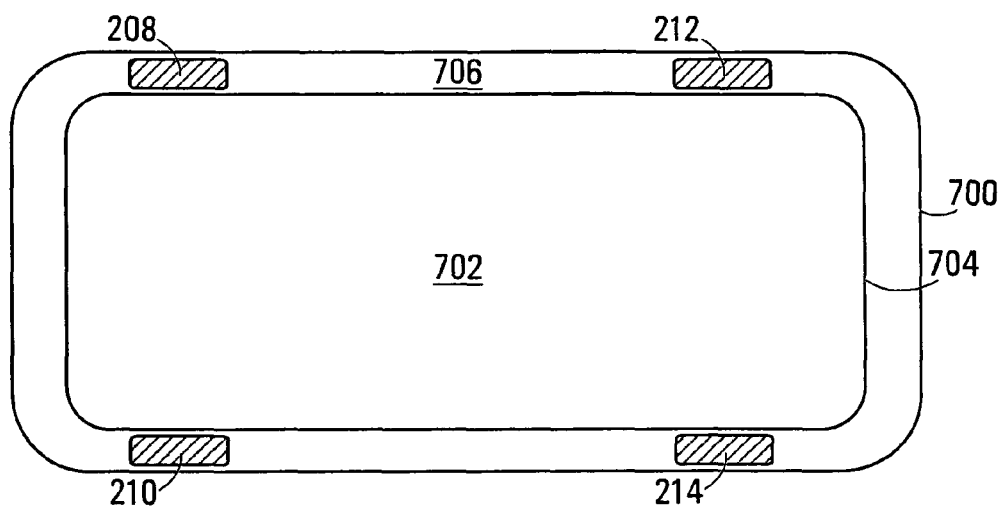
FIG. 7 is a plan view of the tray according to a variant.

The example of implementation shown in FIG. 2 depicts the areas 208, 210, 212 and 214 placed in the respective corners of the tray 200. This is done in order to reduce the likelihood of obscuring anyone of those areas 208, 210, 212 and 214 by an article that is placed in the tray. For instance, if an article is put in the tray immediately above anyone of those areas 208, 210, 212 and 214, the X-ray signature of that area may not be correctly read since the X-ray image will be the result of a composite response (the area 208, 210, 212 and 214 and the article on top of it). In order to further reduce the possibility of obscuring the areas 208, 210, 212 and 214 it is possible to place the areas 208, 210, 212 and 214 at a location that is outside the zone in the tray where the articles to be screened are located. An example of such embodiment is shown in FIG. 7. The tray 700 defines a central article receiving area 702 in which are placed the articles to be screened. The article receiving area 702 is surrounded by a rim portion 704 that extends peripherally and fully encircles the article receiving area 702. The rim portion 704 has a top area 706 that is flat and that is sufficiently wide such as to accept the reference areas 208, 210, 212 and 214. In this fashion, articles to be screened are unlikely obscure anyone of the areas 208, 210, 212 and 214 that remain outside the central article receiving area.

In a possible variant, the tray 200 is used to provide a material reference during the X-ray scanning process to limit or avoid altogether machine induced variations in the results. Since in practice different X-ray apparatuses are never identical and manifest some variations that can be either at the level of the X-ray detectors elsewhere in the machine, those variations can impact the detection results.

Under this variant, the tray 200 is used as a known reference for the X-ray scanning apparatus. Accordingly, when the X-ray scanning process is performed the X-ray apparatus 100 can use the X-ray signature of the tray 200 to self-calibrate or compensate the image data for variations.

Since in the course of an X-ray scanning operation the tray 200 will be used repeatedly, the self-calibration operation occurs with regularity, thus enhancing the performance of the X-ray apparatus in terms accuracy in identifying security threats.

Under this variant, the reference areas 208, 210, 212 and 214 are not compared to anyone of the articles that are put in the tray 200 during the scanning operation. Rather, the processing module 500 senses the X-ray signatures of the reference areas 208, 210, 212 and 214 and determines if there is any variation from what those signatures are expected to be. Recall that since the reference areas 208, 210, 212 and 214 are made from known materials, hence their x-ray signatures are known, the module 500 can determine if there is any variation between the nominal X-ray signatures (the expected signatures) and those read by the X-ray apparatus 100.

If deviations are observed, the module 500 can perform a corrective action. Such corrective action may include compensating the signatures to X-rays observed in connection with items in the tray that are being scanned.

After the X-ray scanning process has been completed, the locations of reference areas 208, 210, 212 and 214 in the X-ray image are identified by anyone of the techniques described earlier. Subsequently, the X-ray signatures of the reference areas 208, 210, 212 and 214 are determined.

In one specific example, the X-ray signatures that are being read can be expressed in term of gray scale values. If the reference areas 208, 210, 212 and 214 are all uniform, the X-ray signature of each one of them can be expressed as a single gray scale value. The nominal X-ray signatures of the reference areas 208, 210, 212 and 214 can be stored in the memory of the module 500 or they can carried or expressed on the tray 200 for automatic reading by the image processing software of the module 500. The nominal gray scale values can be expressed on the tray as bar codes or any other encoding that can be read by the image processing software.

If the nominal X-ray signatures are stored in the memory of the module 500, they can be arranged in a database, such as database 134, particularly if a number of different X-ray signatures are to be maintained. To locate the proper entry in the database the image processing software in the module 500 can use several different techniques. In one case, the image processing software determines an identifier of a reference area 208, 210, 212 and 214 and uses that identifier to find the proper entry in the database. The identifier can be printed or otherwise marked on the tray 200, in the manner discussed earlier such that it appears in the X-ray image.

The other option, where the X-ray signatures of the reference areas 208, 210, 212 and 214 are marked on the tray 200 itself, those X-ray signatures are represented by any suitable method such as a bar code or any other machine readable format that can be read by the image processing software in the module 500.

Irrespective of the option chosen, the module 500 determines the X-ray signature of the reference areas 208, 210, 212 and 214 by processing the image data generated by the X-ray apparatus 100 and then determines the nominal X-ray signatures of the 208, 210, 212 and 214. Both sets of X-ray signatures are then compared. If there is a match within a certain tolerance, the X-ray apparatus is deemed to be calibrated. On the other hand, if there is a variation outside the tolerance range, then a corrective action is taken.

The corrective action may vary depending upon the particular implementation chosen. When the tray 200 has several reference areas having different X-ray signatures, it is possible to determine the X-ray machine induced variations for a range of different materials (reference areas). In that case, the corrective action may be a simple global compensation of the image data, which produces compensated image date where each portion of the image is compensated in the same fashion. The degree of compensation is determined on the basis of a computed average of the variations between the nominal X-ray signatures and the X-ray signatures that are being measured from the image data.

A more sophisticated approach is to compensate parts of the image differently based on how close they are to the reference areas 208, 210, 212 and 214. For instance, the module 500 determines a specific compensation to carry out in connection with each reference area 208, 210, 212 and 214 and then applies those compensations selectively to different image portions depending on how close the image portions are to the respective reference areas 208, 210, 212 and 214. In this fashion, the overall compensation more accurately tracks the X-ray induced machine variations.

The identification of the different areas in the image and their association to the respective reference areas 208, 210, 212 and 214 which determines which compensation to apply, can be done by segmenting the image. Such segmentation can be done in any arbitrary fashion, such as by dividing the image in to regular blocks and then associating each block to a different reference area 208, 210, 212 and 214. The association can be done by processing the image information in each block and determining how close the gray level values are to anyone of the gray level values of the reference areas 208, 210, 212 and 214. Once the comparison is made, each block is assigned to anyone of the reference areas 208, 210, 212 and 214 and the compensation for anyone of those areas is then applied to the block.

Once the compensated image is produced it can be processed by using any suitable techniques to determine the security status of the articles placed in the tray 200. Those techniques are automated techniques and they may include determining the density, effective atomic number, diffraction/scattering signature or a combination thereof on the basis of software processing of the compensated image data.

Note that in simple situations, the tray 200 may not need to be provided with multiple reference areas 208, 210, 212 and 214. The tray 200 itself may be made from a material that constitutes a reference area. In this case the tray 200 has a single reference area.

Although various embodiments have been illustrated, this was for the purpose of describing, but not limiting, the invention. Various modifications will become apparent to those skilled in the art and are within the scope of this invention. Specifically, note that while the examples of implementation provided earlier are directed to the assessment of the security status of liquid products, the invention is not limited to the screening of liquid products and can be used for screening other products as well. In particular, the invention can be used to identify and/or assess the threat status of materials in bulk form. This could be done by placing a sample of the material in a tray and performing the assessment as described earlier to identify the material/and or assess its security status. Also, the screening process described above is not limited to the use of X-rays. Other penetrating radiation can be used.

The invention claimed is:

1. Method for performing security screening at a checkpoint, including:
    a) placing a liquid product in a tray having at least two reference areas manifesting respective X-ray signatures when exposed to X-rays, the X-ray signatures being distinguishable from one another;
    b) performing an X-ray inspection of the tray while the tray holds the liquid product, the X-ray inspection including deriving the X-ray signatures;
    c) determining if the liquid product is a security threat based at least in part on the X-ray signatures.

2. A method as defined in claim 1, including generating X-ray image data during the X-ray inspection and deriving the X-ray signatures from the X-ray image data.

3. A method as defined in claim 2, including processing the X-ray image data with a computer based processing device in determining if the liquid product is a security threat.

4. A method as defined in claim 3, wherein the X-ray image data conveys X-ray image information on the liquid product.

5. A method as defined in claim 4, wherein the X-ray signatures in the X-ray image data are conveyed by respective grey scale levels of portions of the image that correspond to the respective reference areas.

6. A method as defined in claim 1, wherein the performing of the X-ray inspection is made by an X-ray imaging system, the determining including using the X-ray signatures to perform self-calibration of the X-ray imaging system.

7. A method as defined in claim 1, wherein the determining including comparing the X-ray signatures of the reference areas to an X-ray signature of the liquid product.

8. A method as defined in claim 1, wherein the tray includes more than two reference areas, the reference areas manifesting respective X-ray signatures when exposed to X-rays, the X-ray signatures being distinguishable from one another.

9. Method for performing security screening at a checkpoint, including:
    a) providing an X-ray imaging system having a scanning area;
    b) providing a supporting device for supporting articles to be scanned in the scanning area, wherein the supporting device has at least two reference areas manifesting respective X-ray signatures when exposed to X-rays, the X-ray signatures being distinguishable from one another;
    c) placing an article to be scanned on the supporting device;
    d) introducing the article to be scanned in the scanning area while the article is supported by the supporting device;
    e) based at least in part on the X-ray imaging system, deriving the X-ray signatures of the reference areas and obtaining an X-ray image of the article while the article is supported on the supporting device;
    f) determining if the article is a security threat based at least in part on the X-ray signatures.

10. A method as defined in claim 9, including moving the article away from the scanning area while the article is supported on the supporting device.

11. A method as defined in claim 10, wherein the article is a first article, the method including:
    a) removing the first article from the supporting device;
    b) placing a second article in the supporting device;
    c) introducing the second article in the scanning area while the second article is supported by the supporting device;

d) based at least in part on the X-ray imaging system, deriving the X-ray signatures of the reference areas and obtaining an X-ray image of the second article while the second article is supported on the supporting device;

e) determining if the second article is a security threat based at least in part on the X-ray signatures.

12. A method as defined in claim 9, wherein the supporting device includes a tray.

13. A method as defined in claim 12, wherein the article includes a liquid product.

14. A method as defined in claim 13, including generating X-ray image data which conveys X-ray image information on the liquid product and the X-ray signatures of the reference areas.

15. A method as defined in claim 14, including processing the X-ray image data with a computer based processing device in determining if the liquid product is a security threat.

16. A method as defined in claim 15, wherein the X-ray signatures in the X-ray image data are conveyed by respective grey scale levels of portions of the image that correspond to the respective reference areas.

17. A method as defined in claim 9, wherein the determining including using the X-ray signatures to perform self-calibration of the X-ray imaging system.

18. A method as defined in claim 9, wherein the determining including comparing the X-ray signatures of the reference areas to an X-ray signature of the liquid product.

19. A method as defined in claim 9, wherein the supporting device includes more than two reference areas, the reference areas manifesting respective X-ray signatures when exposed to X-rays, the X-ray signatures being distinguishable from one another.

20. A method for performing security screening on a plurality of liquid products at a security checkpoint, comprising:
    a) providing an X-ray imaging system having a scanning area;
    b) providing a supporting device for supporting a liquid product during a scanning cycle performed with the X-ray imaging system on the liquid product, the supporting device including at least one reference material manifesting an X-ray signature in response to exposure to X-rays;
    c) using the supporting device to perform a succession of scanning cycles on respective ones of the liquid products;
    d) wherein each scanning cycle includes:
        i.) deriving the X-ray signature of the reference material;
        ii.) performing a self-calibration of the X-ray imaging system based at least in part on the X-ray signature;
        iii.) determining if the liquid product is a security threat.

21. A method as defined in claim 20, wherein the X-ray imaging system determines if the liquid product is a security threat by processing X-ray image data of the liquid product.

22. A method as defined in claim 21, wherein each scanning cycle includes subjecting the supporting device and the liquid product to X-rays and deriving X-rays image data of the supporting device and of the liquid product.

23. A method as defined in claim 22, wherein each scanning cycle includes deriving the X-ray signature from the X-ray image data.

24. A method as defined in claim 23, wherein each scanning cycle includes processing the X-ray image data to determine if the liquid product is a security threat.

25. A method as defined in claim 24, wherein the supporting device includes two or more reference materials manifesting respective X-ray signatures when exposed to X-rays, the X-ray signatures being distinguishable from one another.

26. A method as defined in claim 25, wherein the X-ray signatures in the X-ray image data are conveyed by respective grey scale levels of portions of the image that correspond to the respective reference materials.

27. A method as defined in claim 20, wherein the supporting device includes a tray.

28. A method for performing security screening on liquid products, comprising;
    a) scanning the liquid product, a first reference material and a second reference material with an X-ray imaging system, the first reference material and the second reference material manifesting respective X-ray signatures when exposed to X-rays, the X-ray signatures being distinguishable from one another, the scanning generating X-ray image data of the liquid product and of the first and second reference materials;
    b) deriving the X-ray signature from the X-ray image data;
    c) performing a self-calibration of the X-ray imaging system based at least in part on the X-ray signature;
    d) determining with the self-calibrated imaging system if the liquid product is a security threat.

29. A method as defined in claim 28, wherein the first and the second reference materials are provided in a tray which supports the liquid product while the liquid product is scanned with the X-ray imaging system.

30. A tray for supporting an article while the article is subjected to X-ray inspection, the tray including at least two reference areas manifesting respective X-ray signatures when exposed to X-rays, the X-ray signatures being distinguishable from one another, wherein the tray has an article receiving area in which one or more articles to be subjected to X-ray inspection can be placed and a rim portion that extends along the article receiving area, at least one of the reference areas being located on the rim portion.

31. A tray as defined in claim 30, wherein the tray is made from base material in which is placed an insert of reference material corresponding to one of the reference areas.

32. A tray as defined in claim 31, wherein the X-ray signatures are characterized by respective grey scale levels in an X-ray image of the tray.

33. A tray as defined in claim 32, wherein the grey scale level of each reference area is uniform across the reference area.

34. A tray as defined in claim 30, wherein the tray is made from base material in which are placed inserts of reference materials corresponding to the reference areas.

35. A tray as defined in claim 34, wherein the reference materials are distinct from one another.

36. A tray as defined in claim 30, wherein at least one of the reference areas is located within the article receiving area.

37. A tray as defined in claim 30, wherein the rim portion includes a flat top area, the at least one of the reference areas being located on the flat top area.

38. An X-ray inspection station for performing security screening on liquid products, the X-ray inspection station comprising:
    a) an X-ray scanning area where one or more liquid products are exposed to X-rays;
    b) a supporting device for supporting one or more liquid products while the liquid products are exposed to X-rays in the scanning area, the supporting device having at least two reference areas manifesting respective X-ray signatures when exposed to X-rays, the X-ray signatures being distinguishable from one another;
    c) a computer based processing unit responsive to an interaction between X-rays and the supporting device to perform self-calibration for processing X-ray image data of the one or more liquid products to determine if the one or more liquid products are a security threat.

39. An X-ray inspection station as defined in claim 38, wherein the computer based processing unit processes information conveying the X-ray signatures for performing self-calibration.

40. An X-ray inspection station as defined in claim 39, wherein the X-ray signatures are conveyed in the X-ray image data.

41. An X-ray inspection station as defined in claim 40, wherein the X-ray signatures in the X-ray image data are conveyed by respective grey scale levels of portions of the image that correspond to the respective reference areas.

42. A method for performing security screening of a liquid product at a security checkpoint, comprising;
   1) placing the liquid product in a tray which has a reference area;
   2) performing an X-ray inspection of the tray holding the liquid product;
   3) comparing the X-ray signature of the liquid product to the X-ray signature of the reference area;
   4) determining a threat status associated with the liquid product based at least in part on results obtained by comparing the X-ray signature of the liquid product to the X-ray signature of the reference area, the threat status conveying whether the liquid product is a security threat.

43. A method as defined in claim 42, wherein the tray has a plurality of reference areas, the reference areas having different X-ray signatures.

44. A method as defined in claim 42, wherein the comparing is done by a computer.

45. A method as defined in claim 44, wherein the X-ray inspection is performed by an X-ray imaging system.

46. A method as defined in claim 45, wherein the X-ray imaging system produces X-ray image data, the method including performing an analysis of the X-ray image data with the computer to determine the threat status of the liquid product.

47. A security screening system suitable for determining if a liquid product presents a security threat, the liquid product being comprised of a container holding a liquid, the screening system comprising:

1) an input for receiving image data conveying an image depicting the liquid product and depicting a reference area, the image data being produced by subjecting the liquid product and the reference area to penetrating radiation;
   2) a logic module for:
      i) deriving from the image data a signature to penetrating radiation of the liquid held in the liquid product;
      ii) processing the image data to derive a signature to penetrating radiation of the reference area;
      iii) comparing the derived signature to penetrating radiation of the liquid held in the liquid product to the derived signature to penetrating radiation of the reference area;
      iv) processing the image data at least in part based on results obtained in iii) to derive a threat status associated with the liquid product, the derived threat status conveying whether the liquid product poses a security threat.

48. A security screening system as defined in claim 47, wherein the penetrating radiation includes X-rays.

49. A security screening system as defined in claim 47, wherein the reference area includes a reference liquid material.

50. A security screening system as defined in claim 49, wherein the reference liquid material is selected from the group consisting of water, carbonated beverage, fruit juice, toothpaste and a cosmetic liquid.

51. A security screening system as defined in claim 47, wherein said image data received at said input conveys an identifier allowing locating an entry in a database that conveys the signature to penetrating radiation of the reference area.

52. A security screening system as defined in claim 47, wherein the image conveyed by the image data received at said input depicts the liquid product and a plurality of reference areas, the image being produced by subjecting the liquid product and the plurality of reference area to penetrating radiation, each reference area in said plurality of reference areas being associated with a respective signature when exposed to penetrating radiation.

* * * * *

UNITED STATES PATENT AND TRADEMARK OFFICE
CERTIFICATE OF CORRECTION

| | | |
|---|---|---|
| PATENT NO. | : 8,009,800 B2 | Page 1 of 1 |
| APPLICATION NO. | : 12/385253 | |
| DATED | : August 30, 2011 | |
| INVENTOR(S) | : Aidan Doyle et al. | |

It is certified that error appears in the above-identified patent and that said Letters Patent is hereby corrected as shown below:

Title Page, Item (54) and at Column 1, lines 1-3, the words "USE" and "IN" are missing in the title. The title should read "TRAY FOR USE IN ASSESSING THE THREAT STATUS OF AN ARTICLE AT A SECURITY CHECK POINT"

Signed and Sealed this
Twenty-ninth Day of November, 2011

David J. Kappos
*Director of the United States Patent and Trademark Office*